Patented June 3, 1952

2,599,249

UNITED STATES PATENT OFFICE 2,599,249

METHOD OF COPOLYMERIZING ETHYLENE WITH BUTADIENE

Bernard S. Friedman, Chicago, Ill., assignor to Sinclair Refining Company, New York, N. Y., a corporation of Maine No Drawing. Application March 7, 1950, Serial No. 148,273

1 Claim. (Cl. 260—680)

I have discovered that ethylene will copolymerize with butadiene in the presence of a cobalt oxide catalyst at temperatures in the range approximating 165° to 575° F. and at pressures between about 100 to 1000 p. s. i. g. to form surprisingly attractive yields of higher molecular weight straight-chain diolefin copolymer products. For example, I have found that reacting ethylene, at a space velocity of about 75 volumes measured as gas at S. T. P. per volume of catalyst per hour, with butadiene, at a space velocity of about 150, in the presence of coconut charcoal impregnated with cobalt oxide at about 195° F. and 200 p. s. i. g. results in the formation of reaction products containing hexadiene, octadiene and decadiene in good yield.

In accordance with my invention ethylene is reacted with butadiene to form the higher molecular weight straight-chain diolefin copolymers. I have found that reaction of only ethylene under similar conditions will result in the formation of straight chain olefin polymers, such as butene, hexene, octene, etc. Propylene, for instance, is highly resistant to any polymerization at all. On the other hand, I have found that the reaction of butadiene alone tends to the formation of cyclic polymers such as vinylcyclohexene and any straight chain polymerization products incidentally formed are in very poor yield.

The amounts of ethylene and butadiene reacted may be varied considerably. However, an excessive proportion of either tends to poor yields and is generally wasteful. I have found that space velocities in the range approximating 25 to 400 volumes of each reactant per volume of catalyst per hour results in the formation of attractive amounts of copolymer reaction products. In particular, space velocities of about 50 to 300 for each are advantageously employed. In addition, I have found it desirable to remove any oxygen, sulfur or other compounds in the ethylene which might poison the catalyst. For instance, the ethylene may be passed over activated nickel prior to reaction to eliminate these contaminants.

The reaction is carried out in the presence of a supported cobalt oxide catalyst. In particular, I have found cobalt oxide deposited on a wood charcoal or an activated coconut charcoal support to be highly advantageous as a catalyst.

The copolymerization reaction is effected at temperatures in the range approximating 165° to 575° F. and at pressures between about 100 to 1000 p. s. i. g. I prefer thermal reaction environments of about 200 to 300° F. at pressures of about 200 to 300 p. s. i. g.

Although my invention is not predicated upon any particular theory, it is my belief that the reaction proceeds as a stepwise addition of the molecules of ethylene to the butadiene molecule. For instance, as follows:

$CH_2=CH-CH=CH_2+CH_2=CH_2 \rightarrow$
$CH_2=CH-CH_2CH_2-CH=CH_2+CH_2=CH_2 \rightarrow$
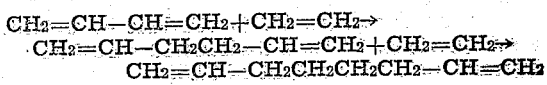

and so forth. It is also interesting to note that more severe reaction conditions within the scope of my invention apparently direct the reaction to the higher molecular weight copolymers.

The straight-chain diolefin copolymer products prepared in accordance with my process have considerable utility as intermediates in the synthesis of difunctional compounds. For instance, dichlorides may be formed from the copolymers by reaction with hydrochloric acid; or glycols by hydration of both of the ethylenic groups; or dibasic acids by oxidation of both vinyl groups and so forth. These conversions may be effected in good yield due to the lack of branching in the diolefinic hydrocarbon. In addition, condensation of these products with dimercaptans lead to polysulfides useful as plastics or plasticizers.

The following examples are intended to more clearly illustrate my invention.

EXAMPLE I

Ethylene and butadiene were introduced into a stainless steel reactor tube containing 250 cc. of activated coconut charcoal impregnated with cobalt oxide and heated by "doughnut" heaters surrounding the tube. The ethylene gas feed was first passed through activated nickel in order to remove catalyst poisoning agents such as oxygen and sulfur compounds. The ethylene was passed into the reactor tube at a space velocity of 72 volumes per volume of catalyst per hour and the butadiene through a separate line at a space velocity of 153 v./v./hr. The reaction was carried out at a temperature of about 194° F. and at a pressure of 200 p. s. i. g. A total of 45 grams of ethylene and 185 grams of butadiene were reacted. 240 grams of effluent products were taken off from the reaction zone and passed through a vapor-liquid separator where 21 grams of heavier, liquid components were removed from the gas stream. These liquid products were fractionated and the resulting cuts analyzed for refractive index, gravity and hydrogen value, as follows:

*Cut No. 1*

| | |
|---|---|
| Average boiling range, °F | 150–158 |
| Weight per cent of charge to still | 13.4 |
| Refractive index, $N_4^{20}$ | 1.4132 |
| Gravity, $D_4^{20}$ | 0.694 |
| Hydrogen value (catalytic hydrogenation) | 490 |

*Cut No. 2*

| | |
|---|---|
| Average boiling range, °F | 264 |
| Weight per cent of charge to still | 9.6 |
| Refractive index, $N_4^{20}$ | 1.4379 |
| Gravity, $D_4^{20}$ | 0.751 |
| Hydrogen value (catalytic hydrogenation) | 502 |

*Cut No. 3*

| | |
|---|---|
| Average boiling range, °F | 340 |
| Weight per cent of charge to still | 8.7 |
| Refractive index, $N_4^{20}$ | 1.4383 |
| Gravity, $D_4^{20}$ | 0.783 |
| Hydrogen value (catalytic hydrogenation) | 376 |

The gas stream from which these liquid products were removed was then passed through a Dry Ice-acetone trap where the condensible portion, 59 grams, was removed. The non-condensible gases, 160 grams, contained 40.0% ethylene by weight, 2.6% butylene, 17.0% butadiene-1,3 and had an average molecular weight of 34.5.

EXAMPLE II

Ethylene and butadiene were introduced into a reaction system similar to that of Example I at space velocities of 230 v./v./hr. and 90 v./v./hr., respectively. The reaction was carried out at a temperature of about 400° F. at a pressure of 400 p. s. i. g. A total of 144 grams of ethylene and 112 grams of butadiene were reacted. 6.3% of ethylene and 52.6% of butadiene by weight were converted. 294 grams of effluent products were taken off from the reaction zone and passed through a vapor-liquid separator, where 83.0 grams of heavier, liquid components were removed from the gas stream. These liquid products were fractionated and the resulting cuts analyzed for refractive index, gravity and hydrogen value, as follows:

*Cut No. 1*

| | |
|---|---|
| Average boiling range, °F. | 248 |
| Weight per cent of charge to still | 11.5 |
| Refractive index, $N_D^{20}$ | 1.4279 |
| Gravity, $D_4^{20}$ | 0.729 |
| Hydrogen value (catalytic hydrogenation) | 380 |

*Cut No. 2*

| | |
|---|---|
| Average boiling range, °F. | 269 |
| Weight per cent of charge to still | 10.5 |
| Refractive index, $N_D^{20}$ | 1.4598 |
| Gravity, $D_4^{20}$ | 0.794 |
| Hydrogen value (catalytic hydrogenation) | 430 |

*Cut No. 3*

| | |
|---|---|
| Average boiling range, °F. | 343 |
| Weight per cent of charge to still | 9.8 |
| Refractive index, $N_D^{20}$ | 1.4481 |
| Gravity, $D_4^{20}$ | 0.775 |
| Hydrogen value (catalytic hydrogenation) | 300 |

The gas stream from which these liquid products were removed was then passed through a Dry Ice-acetone trap where the condensible portion, 47.0 grams, was removed. The non-condensible gases, 164.0 grams, had an average molecular weight of 31.1.

Thus distillation of the effluent liquid products from these exemplary runs show the formation of higher molecular weight straight-chain diolefin copolymer products. For instance, the liquid effluent of Example I was distilled into a C₆-rich fraction (above, Cut No. 1) containing at least 65% hexadiene, apparently the 1,4-isomer; a C₈-rich fraction (Cut No. 2) containing principally octadiene, apparently the 1,6- and 2,6-isomers; and a C₁₀-rich fraction (Cut No. 3) composed mostly of decadiene. Accordingly, the butadiene has apparently condensed with one, two and three molecules of ethylene, respectively, to form the higher copolymers.

In Example II, distillation showed that octadiene (Cut No. 2) and decadiene (Cut No. 3) fractions were formed, although the hexadiene fraction apparently was not present. These differences probably derive in large measure from the fact that the run comprising Example II was conducted at higher temperatures and pressures.

Comparison of the distillation cuts from each example with literature data for pure compounds clearly illustrate the nature of my results:

| | Cut No. 1 | | Literature Data for: | | | |
|---|---|---|---|---|---|---|
| | Ex. I | Ex. II | 3-Hexene | 1,4-$C_6H_{10}$ | 1,5-$C_6H_{10}$ | 1,5-$C_8H_{14}$ |
| B. P., °F | 150–158 | 248 | 152.6 | 148 | 139 | 244.5 |
| $N_D^{20}$ | 1.4132 | 1.4279 | 1.3942 | 1.4162 | 1.4040 | 1.4265 |
| $D_4^{20}$ | 0.694 | 0.729 | 0.6816 | 0.6996 | 0.6916 | 0.7314 |
| H₂ Value | 490 | 380 | 302 | 620 | 620 | 460 |

| | Cut No. 2 | | Literature Data for: | | |
|---|---|---|---|---|---|
| | Ex. I | Ex. II | 1,7-$C_8H_{14}$ | 1,6-$C_8H_{14}$ | 2,6-$C_8H_{14}$ |
| B. P., °F | 264 | 269 | 244 | 252–257 | 256 |
| $N_D^{20}$ | 1.4379 | 1.4598 | 1.4211 | 1.4400 | 1.4336 |
| $D_4^{20}$ | 0.751 | 0.794 | 0.7320 | 0.748 | 0.7441 |
| H₂ Value | 502 | 430 | 460 | 460 | 460 |

|  | Cut No. 3 | | Literature Data for: | | | |
|---|---|---|---|---|---|---|
|  | Ex. I | Ex. II | 2,8-$C_{10}H_{18}$ | 3,7-$C_{10}H_{18}$ | 1,3-$C_{10}H_{18}$ | 1,4-$C_{10}H_{18}$ |
| B. P., °F. | 340 | 343 | 334 | 332 | 336 | 341 |
| $N_D^{20}$ | 1.4383 | 1.4481 | 1.4386 | 1.4377 | 1.4387 | 1.4450 |
| $D_4^{20}$ | 0.783 | 0.775 | 0.7665 | 0.7586 | 0.750 | 0.7593 |
| $H_2$ Value | 376 | 300 | 368 | 368 | 368 | 368 |

I claim:

The method of forming liquid, higher molecular weight straight-chain diolefin copolymers having from 6 to 10 carbon atoms which comprises the step of reacting ethylene with butadiene in the presence of cobalt oxide-charcoal catalyst at a temperature in the range approximating 165° to 575° F. and at a pressure between about 100 to 1000 p. s. i. g. at a reaction space velocity in the range of about 25 to 400 volumes of each of the fluid reactants per volume of catalyst per hour.

BERNARD S. FRIEDMAN.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,332,276 | Stahly | Oct. 19, 1943 |
| 2,381,198 | Bailey et al. | Aug. 7, 1945 |